May 1, 1962 J. BONOMO ETAL 3,031,980

YEAST RAISED DOUGH MIXING METHOD

Filed July 19, 1960

Joseph Bonomo
Patsy Deiorio
John Coffaro
INVENTORS.

BY *Lawrence A. O'Brien*
*and Harvey B. Jackson*
Attorneys

United States Patent Office 3,031,980
Patented May 1, 1962

3,031,980
YEAST RAISED DOUGH MIXING METHOD
Joseph Bonomo, Utica, N.Y., Patsy De Iorio, 1308 Sherman Drive, Utica, N.Y., and John Coffaro, Brooklyn, N.Y.; said Bonomo and said Coffaro assignors to said De Iorio
Filed July 19, 1960, Ser. No. 43,708
2 Claims. (Cl. 107—54)

The present invention relates to a process or method for mixing bakery doughs.

This case is a continuation-in-part of our copending application Serial No. 492,406, filed March 7, 1955, entitled, Yeast Raised Dough Mixing Method, and now abandoned. The latter application is a continuation-in-part of our copending application Serial No. 464,342, filed October 25, 1954, entitled Dough Mixing Machine, and now abandoned.

In the mixing of doughs at present, doughs are usually mixed in either high speed mixers, having a speed of from 60 to 70 r.p.m. or low speed mixers having a speed of 20 to 40 r.p.m.

In the utilization of high speed mixers, it is necessary to utilize ice to maintain the dough temperature to the degree of coolness required for making a proper dough; however, by virtue of the necessity for using ice or other refrigeration, the dough is improperly mixed and the resultant bakery products therefrom disclose poor crust characteristics, coarse, open grain cell structure and relatively poor keeping qualities. In their favor, such mixers mix doughs in a comparatively short time, usually in the neighborhood of ten to fifteen minutes.

Even in the utilization of low speed mixers, ice is also very often a necessary ingredient thereof to maintain the dough at the proper degree of coolness. This type of mixer, while it produces a loaf of bread that has good crust characteristics, a fine grain cell structure and good texture, does not produce a loaf with sufficient volume to satisfy the bakery trade. Also, these low speed mixers generally require twenty-five to thirty-five minutes to properly mix the dough.

Hence, there has always been a problem in the baking industry, particularly in the making of semi-firm doughs, sometimes called Italian bread doughs, of producing a satisfactory bread loaf.

We have discovered a process for mixing doughs, which process requires no ice or refrigeration in its practice and which process can be utilized with either high or low speed mixers, but preferably with low speed mixers reducing the mixing time of such low speed mixers to approximately ten minutes, which process will further provide a dough which will yield a final baked bread product having a volume measurement that will satisfy the trade, which bread products will possess fine grained cell characteristics and fine texture with good tender crust characteristics and soft crumbs.

Basically, our invention resides in the discovery that the utilization of a partial vacuum on the dough during the mixing thereof in a mixing machine greatly improves the dough.

The above noted discovery was made during the testing of our specially designed low speed mixer for the mixing of Italian bread doughs.

Accordingly, it is a primary object of the present invention to disclose a method for producing a bread dough having improved characteristics.

It is another object of the present invention to disclose a method which includes treating bread dough to partial vacuum conditions while mixing the dough.

These, together with other objects and advantages which will become subsequently apparent reside in the details of the disclosed method as more fully hereinafter described and claimed.

It was in the utilization and through the utilization of our machine that we discovered the application of a partial vacuum in the mixing of semi-firm bread doughs and the beneficial effects of this vacuum in reducing the total time required to properly develop a dough and to maintain a lowered dough temperature during the mixing period which mixer is illustrated in detail in the accompanying drawing.

Figure 1:
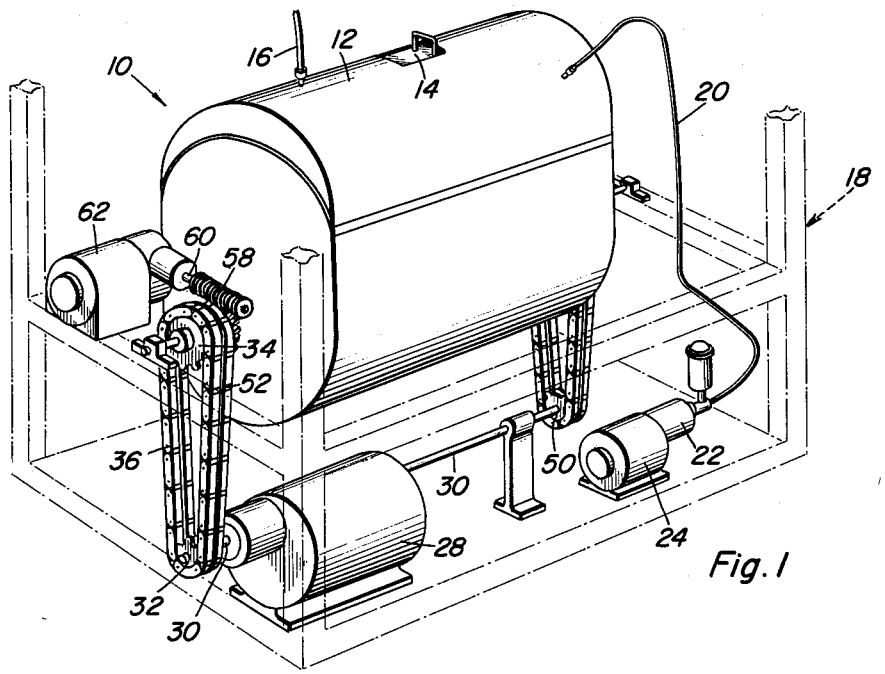
FIGURE 1 is a perspective view of the mixer, which mixer was utilized in the development of the process constituting the present invention.
Figure 2:
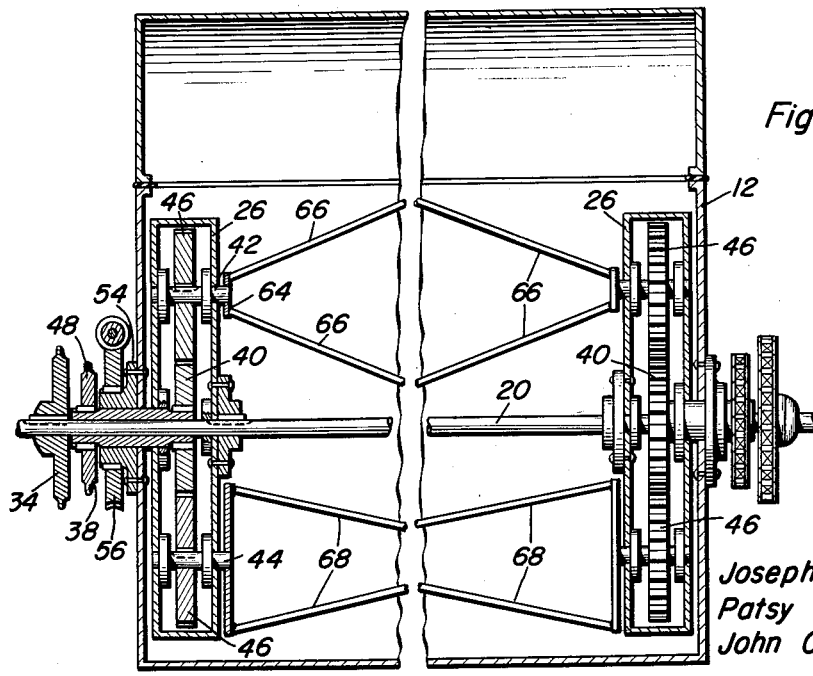
FIGURE 2 is a cross-sectional view through the mixer housing disclosing the agitator arms for mixing the dough.

Referring to the drawing in detail, the dough mixing machine is designated in its entirety by the numeral 10, the mixer 10 being mounted on a suitable framework 18 illustrated in phantom outline.

The mixer comprises an enlarged drum or casing 12 having a sliding gate 14 in the top thereof for the passage of the dough ingredients into the mixer and including a water line 16 also opening into the top of the mixer for suitably wetting the dough ingredients during the mixing thereof.

Extending longitudinally through the drum 12 is an elongated center shaft 20.

A vacuum line 21 opens into the drum at one end thereof and is connected to a vacuum pump 22 at its other end, which vacuum pump is driven by a suitable electric motor or the like 24.

Within the casing 12 and keyed to the shaft 20 adjacent each end of the casing is an elongated housing 26.

Motor 28 has a drive shaft 30 extending therefrom upon which are mounted a pair of sprockets 32, one sprocket being mounted on each end of the drive shaft. Secured to each of the outer ends of the center shaft 20 is a spur gear 34 and endless chains 36 drivingly connect the spur gears 34 to the sprockets 32 for rotating the center shaft 20 and consequently the elongated housings 26 mounted thereon within the casing 12 of the mixer 10.

Rotatably journaled on each end portion of the center shaft 20 and extending into each of the housings 26 is a bearing sleeve 38. Disposed centrally within each housing 26 is central driving gear 40 keyed to each of the bearing members 38.

Each housing 26 additionally carries on diametrically opposite sides of the center shaft 20 axles 42 and 44 respectively, which have driven gears 46, keyed thereon.

Keyed to the outer end of each bearing sleeve 38 is a sprocket gear 48 which is drivingly interconnected by means of the endless chain 52 to a suitable sprocket 50 on the drive shaft 30 from the motor 28.

With the arrangement so far described, upon rotation of the center shaft 20, the housings 26 will also rotate and the gears 46 will be driven in a direction countercurrent to the rotation of the shaft 20 by the driving gear 40 keyed to the bearing sleeve 38.

A hub 54 is rotatably journaled on the outer end portion of one of the bearing sleeves 38 and is fixedly secured to the end wall of the machine casing 10. Keyed on this hub 54 is a gear 56 which drivingly engages a worm gear 58 on the drive shaft 60 of a suitable electric motor 62 whereby upon actuation of the worm 58, the casing 12 may be tumbled in addition to the rotation of the center shaft 20 and the consequent rotation of the housings 26 and gears 46.

In conjunction with the housings 26 and gears 46 keyed to the axles 42 and 44, respectively, it is to be noted on the portions of the axles 42 and 46 extending into the drum are provided mounting plates 64 which carry outwardly diverging mixer or agitator arms 66 and 68 respectively.

The pairs of agitator arms 66 and 68 are circumferentially spaced from one another being on diametrically opposite sides of the center shaft 20 and revolve countercurrently by virtue of the revolution of the gears 46 to the net revolving motion of the center shaft and the housings 26 to provide a slow beating and agitating mixing action for the dough ingredients within the mixer.

*Example*

| | Percent |
|---|---|
| Flour (straight spring flour) 6 lbs., 4 oz. | 100 |
| Water, 3 lbs., 9 oz. | 57 |
| Salt, 1¾ oz. | 1.75 |
| Yeast, 2 oz. | 2 |

Throughout the following series of tests the same batch of flour was utilized. The flour had a moisture content of 14.0%, an ash of .49%, a protein content of 13.60% and a wet gluten of 40.8%. The water utilized had a uniform temperature of 68° F., while the flour had a constant temperature of 76° F. The room temperature of the bakery was maintained at 78° with a relative humidity of 60 to 65%.

The procedure was as follows:

First, the dough was mixed by the method of the present invention; two hours after mixing, the dough was punched; forty-five minutes later the dough was scaled; twenty minutes later the dough was made up; fifty minutes later the dough was proofed; thirty minutes later the dough was baked at a temperature of 400°.

A mixing time of between 10 and 15 minutes was found to be best and this range of time will be observed to be most suitable from the experimental data provided.

A series of doughs were mixed, starting without using a partial vacuum, then using a negative pressure of 10 inches of mercury, and 15 inches of mercury.

To measure the vacuum on the mixer, a vacuum gauge was attached to the mixer.

Each dough after mixing was allowed to ferment for two hours at a constant 80° F. and the normal procedure of making and baking bread from each dough mix followed. One hour after the loaves were baked a volume measurement was made on loaves from each fermentation section and an average was determined and recorded in units of cubic centimeters on the chart set forth below. After the volume measurement, the loaves were wrapped in polyethylene bags and sealed for twenty-four hours. Each loaf was then sliced to an exact thickness of thirteen millimeters and several slices were employed to determine their crumb softness.

After the crumb softness was determined, the cell structure or grain was compared and noted. Following is a record of all the measurements made and noted during the course of this series of mixing tests.

| Flour | Vacuum | Temp., Flour, °F. | Temp., H₂O, °F. | Min. Mix | Temp., Dough, °F. | Dough Character | Loaf Volume | Loaf Appear | Grain Inside Texture | Crumb Softness | General Rating |
|---|---|---|---|---|---|---|---|---|---|---|---|
| 1. Bakers Patent Straight. | None | 76 | 68 | 5 | 80 | Tough and short | 2,350 | Good split | Sl open | Firm | Poor. |
| 2. Bakers Patent Straight. | ---do--- | 76 | 68 | 10 | 82 | ---do--- | 2,600 | ---do--- | Fine | ---do--- | Fair. |
| 3. Bakers Patent Straight. | ---do--- | 76 | 68 | 15 | 85 | Softer, Sl tough | 2,800 | V good split | V fine | ---do--- | Good. |
| 4. Bakers Patent Straight. | ---do--- | 76 | 68 | 20 | 87 | Elastic-soft | 2,550 | Good split | Sl open | ---do--- | Fair. |
| 5. Bakers Patent Straight. | ---do--- | 76 | 68 | 25 | 89 | Soft, Sl sticky, short. | 2,300 | Partial split | Coarse | ---do--- | Poor. |
| 6. Bakers Patent Straight. | −10 inches | 76 | 68 | 5 | 80 | Sl tough | 2,400 | Good split | Sl open | Soft | Poor to fair. |
| 7. Bakers Patent Straight. | ---do--- | 76 | 68 | 10 | 80 | Elastic Sl tough | 2,675 | V good split | Fine | ---do--- | Good. |
| 8. Bakers Patent Straight. | ---do--- | 76 | 68 | 15 | 82 | Elastic V Sl tough | 2,950 | ---do--- | V fine | ---do--- | V. good. |
| 9. Bakers Patent Straight. | ---do--- | 76 | 68 | 20 | 83 | V Sl short | 2,675 | ---do--- | Fine | ---do--- | Good. |
| 10. Bakers Patent Straight. | ---do--- | 76 | 68 | 25 | 84 | Sl short Sl soft and sticky. | 2,350 | Partial split | Coarse | Sl firm | Poor. |
| 11. Bakers Patent Straight. | −15 inches | 76 | 68 | 5 | 80 | Sl tough | 2,450 | Good split | V Sl open | Soft | Fair. |
| 12. Bakers Patent Straight. | ---do--- | 76 | 68 | 10 | 80 | Elastic V Sl tough | 2,750 | V good split | Fine | ---do--- | V. good. |
| 13. Bakers Patent Straight. | ---do--- | 76 | 68 | 15 | 81 | Elastic | 2,825 | ---do--- | V fine | ---do--- | Do. |
| 14. Bakers Patent Straight. | ---do--- | 76 | 68 | 20 | 83 | Sl short | 2,600 | Good | Fine | ---do--- | Good. |
| 15. Bakers Patent Straight. | ---do--- | 76 | 68 | 25 | 83 | Sl short Sl soft and sticky. | 2,375 | Partial split | Coarse | Firm | Poor. |
| 16. Bakers Patent Straight. | −20 inches | 76 | 68 | 5 | 80 | V Sl tough | 2,350 | Good split | V sl open | Sl firm | Do. |
| 17. Bakers Patent Straight. | ---do--- | 76 | 68 | 10 | 80 | Sl tough | 2,400 | ---do--- | Sl open | Soft | Fair. |
| 18. Bakers Patent Straight. | ---do--- | 76 | 68 | 15 | 81 | Tough | 2,300 | Partial split | Coarse | Firm | Poor. |
| 19. Bakers Patent Straight. | ---do--- | 76 | 68 | 20 | 82 | Tough and sticky | 2,275 | ---do--- | ---do--- | ---do--- | Do. |
| 20. Bakers Patent Straight. | ---do--- | 76 | 68 | 25 | 83 | ---do--- | 2,275 | ---do--- | ---do--- | ---do--- | Do. |

NOTE.—V—very; Sl—slightly.
General rating is a composite of volume, loaf appearance, texture and crumb softness.

During the mixing cycle, the speed of the mixer was at slow speed, being specifically at 22 r.p.m. and this mixing speed coupled with countercurrent movement due to the clockwise and counterclockwise movement of the meshing agitator arms or blades developed a superior dough. However, similar comparative results can be obtained by operating the slow speed mixer at any desired slow speed range of between 20 to 40 r.p.m.

When this mixing action was coupled with a partial vacuum, the mixing time necessary is actually shortened; further, a higher water temperature is permissible when the partial vacuum is used to maintain the same dough temperature as is maintained without a vacuum.

From the results of the foregoing tests, it can be seen that doughs mixed under a partial vacuum of 10 to 15 inches for a period of time of 10 to 15 minutes produced the best bread composite characteristics with regard to volume, grain, crumb and general rating. Furthermore, comparing the dough temperature with and without partial vacuum, shows that doughs mixed using a vacuum were up to 6 degrees cooler than those not mixed under a vacuum.

It is our belief that there is no chemical change in the final bakery product of doughs mixed with partial vacuum and those not mixed with partial vacuum. However, the physical characteristics of the doughs are clearly distinct. A dough mixed under the partial vacuum for the optimum period of time of 10 to 15 minutes appears to be properly developed in an atmosphere of just the right amount of air to produce a cell structure that is fine and uniform in appearance. As the mixing time is increased to as high as twenty-five minutes, the dough is "killed" and is lifeless. The resulting bread produced therefrom is unacceptable.

The decreased extent to which the dough temperature rises during mixing obviously provides a means for eliminating the usual practice or need of adding ice or the use of refrigerated jackets on the dough mixer and yet retain the temperature of the dough within the optimum bounds of 79 to 82° F.

Doughs which were mixed under increasing partial vacuum up to a limit showed a higher consistency which was evident with a more pliable feeling than was noticed without any vacuum or with only drawing a slight vacuum. Furthermore, a decided difference was visible as well as evident in the doughs that were mixed without the use of a partial vacuum when compared with those mixed with a partial vacuum.

The volume of the baked loaf as well as the grain cell structure showed marked improvement when the dough was mixed under a partial vacuum beginning with ten inches as compared with the dough mixed without any vacuum. This better volume, grain cell structure improvement continued to improve until a partial vacuum of about fifteen inches of mercury was reached. Then, further increase in the vacuum caused these desirable bread characteristics to begin to fall off.

The crumb softness tests were conducted the day after the bread was baked. The bread mixed under a partial vacuum showed an increasing softness from about ten inches until around fifteen inches, when again the softness of the crumbs started to fall off upon the drawing of a higher vacuum.

It would appear, however, we are not certain, that beyond the fifteen inches of vacuum, insufficient air begins to penetrate the dough and consequently insufficient oxygen is available for the proper fermentation of the yeast that is included in the dough.

The crust characteristics of the dough followed the some pattern as well as the break and shred characteristics as did the other characteristics noted above with the increase in use of partial vacuum.

From these tests, we believe the crust characteristics to be due principally to the development of dough cell structure which reaches an ultimate level in the making of a homogeneous mixture of flour, salt, yeast, water solution and air, when the dough is properly developed in the proper atmosphere of air, which in the series of experiments noted above, appears to center around negative pressure of between 10 to 15 inches of mercury and a mixing time of between 10 to 15 minutes.

In summary, it is submitted that doughs which are mixed in a slow speed mixer of between 20 to 40 r.p.m. under a partial vacuum of from 10 to 15 inches of mercury for 10 to 15 minutes, are firmer on proof, require less time to proof, have optimum development of flour gluten, have superior volume, better grain and texture, eliminate the necessity for ice or refrigerated jackets in the mixers and substantially reduce the mixing times from presently utilized dough mixing processes. Furthermore, vacuum mixing yields a loaf with greater softness, with longer keeping quality in that the crumbs after 24 hours have 5% more moisture.

From the foregoing, it is believed the invention will be readily understood by those skilled in the art and accordingly it is desired to limit the invention only as required by the appended claims.

What is claimed as new is as follows:

1. A method for mixing bread dough yielding fine and uniform final bakery products which comprises mixing the dough in a mixer including a housing, a shaft mounted in the housing, a pair of agitator arms supported from said shaft in circumferentially spaced relation for rotation therewith in one direction and also revolving on their own axes in the opposite direction, the mixer operating at a speed of from between about 20 to 40 revolutions per minute for a period of between 10 to 15 minutes under a partial vacuum of from 10 to 15 inches of mercury.

2. A method for mixing bread dough yielding fine and uniform final bakery products which comprises mixing the dough in a mixer including a housing, a shaft mounted in the housing, a pair of agitator arms supported from said shaft in circumferentially spaced relation for rotation therewith in one direction and also revolving on their own axes in the opposite direction, the mixer operating at a speed of from between about 20 to 40 revolutions per minute in a direction to provide a slow beating and agitating action by revolution of the agitator arms countercurrently to the direction of rotation of the shaft, for a period of between 10 to 15 minutes under a partial vacuum of from 10 to 15 inches of mercury.

References Cited in the file of this patent

UNITED STATES PATENTS

| | | |
|---|---|---|
| 1,750,002 | Gordon | Mar. 11, 1930 |
| 2,059,730 | Gordon | Nov. 3, 1936 |
| 2,792,304 | Pavan | May 14, 1957 |
| 2,868,143 | Strahmann | Jan. 13, 1959 |

FOREIGN PATENTS

| | | |
|---|---|---|
| 568,093 | Great Britain | Mar. 19, 1945 |